US011311361B1

(12) United States Patent
Tapocik

(10) Patent No.: US 11,311,361 B1
(45) Date of Patent: Apr. 26, 2022

(54) HANDLE TO RETAIN A SOURCE OF SUCTION OR LIQUID AT ONE END AND A DENTAL TOOL OR MEDICAL TOOL AT AN OPPOSITE END AND METHOD OF SONIC WELDING OR ULTRASONIC WELDING OF A CONTAINER FOR THE HANDLE

(71) Applicant: Bryan Tapocik, Highland, CA (US)

(72) Inventor: Bryan Tapocik, Highland, CA (US)

(73) Assignee: Innovative Product Brands, Inc., Highland, CA (US)

( * ) Notice: Subject to any disclaimer, the term of this patent is extended or adjusted under 35 U.S.C. 154(b) by 172 days.

(21) Appl. No.: 16/876,892

(22) Filed: May 18, 2020

Related U.S. Application Data

(60) Provisional application No. 62/850,735, filed on May 21, 2019.

(51) Int. Cl.
 *A61C 17/08* (2006.01)
 *A61C 17/12* (2006.01)

(52) U.S. Cl.
 CPC ............ *A61C 17/08* (2019.05); *A61C 17/125* (2019.05)

(58) Field of Classification Search
 CPC .......... A61C 17/02; A61C 17/08; A61C 17/13
 USPC .......................................................... 433/95
 See application file for complete search history.

(56) References Cited

U.S. PATENT DOCUMENTS

| | | | | |
|---|---|---|---|---|
| 4,522,592 A | * | 6/1985 | Johnson | A61C 17/08 433/95 |
| 4,861,266 A | * | 8/1989 | Ashiku | A61C 17/08 433/95 |
| 4,966,551 A | * | 10/1990 | Betush | A61C 17/08 433/95 |
| 5,295,830 A | * | 3/1994 | Shen | A61C 17/08 433/116 |
| 5,480,124 A | * | 1/1996 | Bartlett | A61C 17/08 251/309 |
| 5,882,197 A | * | 3/1999 | Davis | A61C 1/088 433/91 |
| 6,129,547 A | * | 10/2000 | Cise | A46B 11/0006 433/80 |
| 7,287,981 B2 | * | 10/2007 | Hirsch | A61C 1/088 433/29 |
| 9,549,796 B2 | * | 1/2017 | Hirsch | A61C 17/12 |
| 2008/0008977 A1 | * | 1/2008 | Hirsch | A61C 17/13 433/29 |
| 2009/0204065 A1 | * | 8/2009 | Wright | A61M 1/84 604/35 |
| 2014/0004478 A1 | * | 1/2014 | Hirsch | A61C 17/08 433/80 |
| 2014/0308626 A1 | * | 10/2014 | Hirsch | A61C 17/13 433/95 |

(Continued)

*Primary Examiner* — Matthew M Nelson
(74) *Attorney, Agent, or Firm* — Minta Law Group LC; Veronica-Adele R. Cao

(57) ABSTRACT

A handle for retaining a source of suction or water at a rear end and a dental tool or medical tool at a front end. The assembly is made up of a six components: a suction handle back, a suction handle valve body, a suction handle valve, an O-ring, a suction handle front, and a suction handle clip. The suction handle back is assembled with the valve body, O-ring and suction handle valve in place before being sonically or ultrasonically welled to the suction handle front and to the suction handle back. The suction handle valve body protrudes out the back side of the suction handle back to allow for a hose to be attached.

7 Claims, 14 Drawing Sheets

(56) References Cited

U.S. PATENT DOCUMENTS

| | | | | |
|---|---|---|---|---|
| 2015/0305842 | A1* | 10/2015 | Hirsch | A61C 17/08 |
| | | | | 433/95 |
| 2018/0280127 | A1* | 10/2018 | Thomas | A61C 1/052 |
| 2019/0054287 | A1* | 2/2019 | Thomas | A61M 39/24 |
| 2020/0397532 | A1* | 12/2020 | Bushman | A61M 39/22 |

* cited by examiner

HANDLE TO RETAIN A SOURCE OF SUCTION OR LIQUID AT ONE END AND A DENTAL TOOL OR MEDICAL TOOL AT AN OPPOSITE END AND METHOD OF SONIC WELDING OR ULTRASONIC WELDING OF A CONTAINER FOR THE HANDLE

CROSS-REFERENCE TO RELATED APPLICATION

This patent application claims priority to Provisional Application Ser. No. 62/850,735 filed on May 21, 2019.

BACKGROUND OF THE INVENTION

1. Field of the Invention

The present invention relates to the field of dentistry and in particular, to handles used with a source of suction to suck out saliva or remove debris in a patient's mouth during and after a dental procedure. The present invention also involves handles used with a source of water to spray clean a patient's mouth after a dental procedure.

2. Description of the Prior Art

Earlier embodiments of the handle used in conjunction with dental suction apparatus were discussed in the provisional patent application.

The prior art apparatus has many problems during the manufacture of the apparatus and when it was used. There is a significant need for improvements to correct the defects in the prior art apparatus.

SUMMARY OF THE INVENTION

The present invention is an improved handle for retaining a source of suction or a source of water at a rear end and retaining a dental tool at a front end. The handle includes several improvements in both the apparatus and construction of the apparatus. The present invention is an improved handle assembly designed with durability and convenience in mind.

It is an object of the present invention to provide a suction handle with an improved clip with mating registration tabs to assure proper alignment of the clip, a spring action clip to avoid a suction apparatus from falling out of the dental handle during a dental procedure, and sonic or ultrasonic welding of the clip to provide a secure attachment of the clip to the front handle housing of the dental suction handle.

It is another object of the present invention to provide a suction handle with a smooth and uniform inner surface for rapid removal of debris.

It is a further object of the present invention to provide a ribbed five-in-one connector for easy connection to various sizes of connecting tubing.

It is also an object of the present invention to provide a suction handle assembly which is a handheld assembly that allows for easy control of air vacuum suction from the reservoir or pumping port. One end of the suction handle assembly is connected to the desired attachment and the other end is connected to a hose. The hose can either be connected to a port that supplies suction or air, or supplies water, depending on required use.

The assembly of the present invention improved suction handle is made up of six components: a suction handle back (part 1); a suction handle valve body (part 2); a suction handle valve (part 3); an O-ring (part 4), a suction handle front (part 5) and a suction handle clip (part 6). The rear handle housing is assembled with the valve body, O-ring and suction handle valve in place before being sonically or ultrasonically welded to the front handle housing. The rear shaft and source of suction or water attachment protrudes out the back side of the rear handle housing to allow for a hose to be attached. Optionally, a second elongated cylindrical shaft which is attached to the cylindrical valve body includes alignment fins aligned with receiving slots in the rear handle housing, and may be integrally formed with the rear shaft connected to a source of suction or water.

It is additionally an object of the present invention to facilitate using the suction handle to enable a user to control the suction power or amount of suction with the user's thumb. By advancing the suction handle from the "off" position to the "on" position. a user can adjust the air flow. The suction handle valve works like a ball valve allowing air flow to pass through based on its position. Once the valve is in the open position ("on" orientation), this will allow for the vacuum to occur at a variable rate. The suction handle front (part 5) allows for suction attachments to be added while being held in place with the pressure of the suction handle clip (part 6).

It is another object of the present invention to have mating joints which allow for the front and back of the suction handle to be sonically or ultrasonically welded.

It is a further object of the present invention to have locating fins on the suction handle valve body with aligned receiving channels in the interior of the rear suction housing to fascinate proper alignment to provide a clear path from the source of suction or water through the interior of the suction handle to the dental instrument or medical instrument affixed to the front of the dental or medical suction handle.

It is an additional object of the present invention for the components to be sonically or ultrasonically welded to respective attached components, so that the suction handle provides a continuous seal through the valve body to the suction handle front which uses a single O-ring to maintain the suction force.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1A:
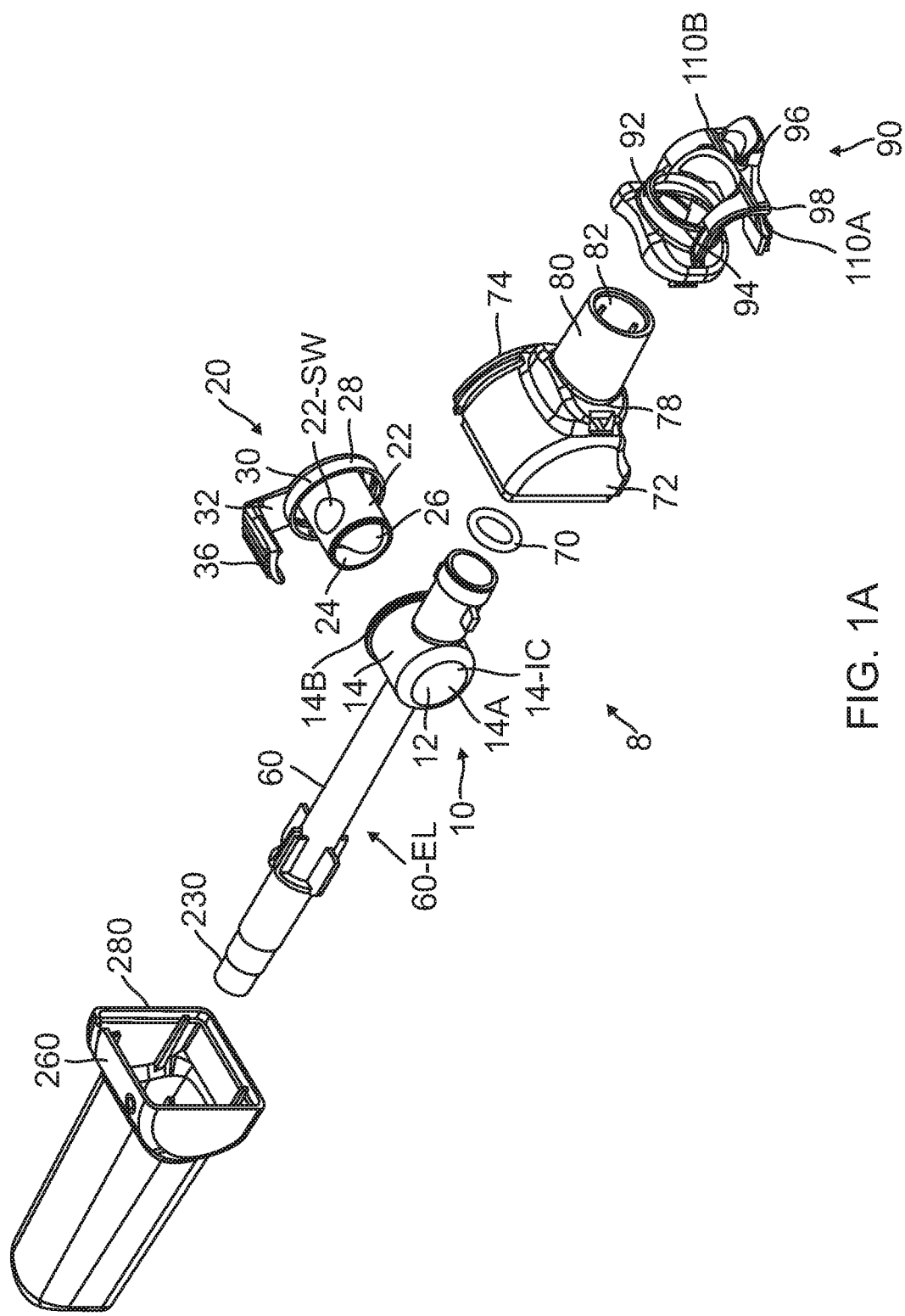
FIG. 1A is an exploded view of the components of the present invention handle to retain a dental tool or medical tool at one end and a source of suction or liquid at an opposite end.
Figure 1B:
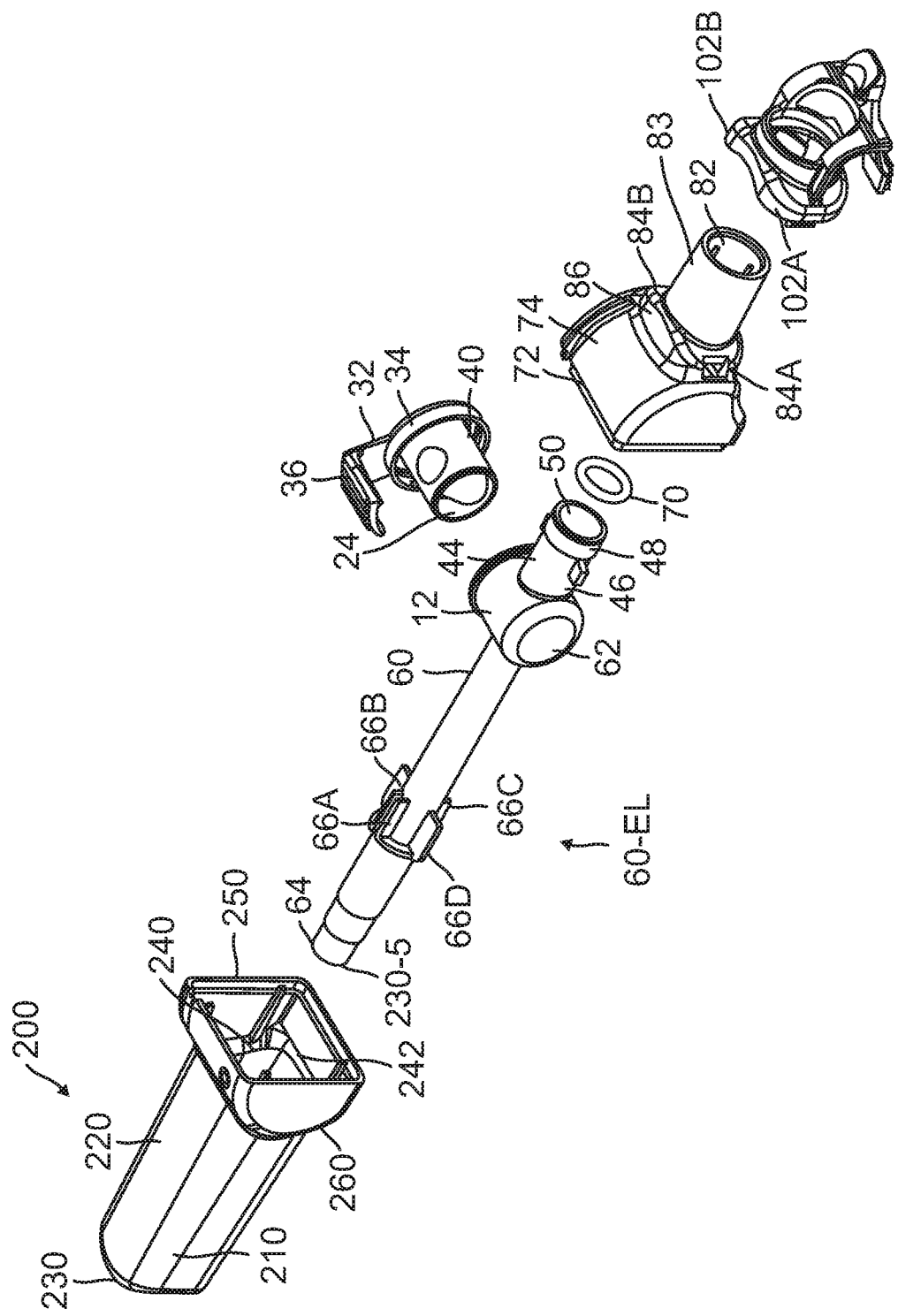
FIG. 1B is a duplicate exploded view of the components of the present invention handle to retain a dental tool or medical tool at one end and a source of suction or liquid at an opposite end.
Figure 2:
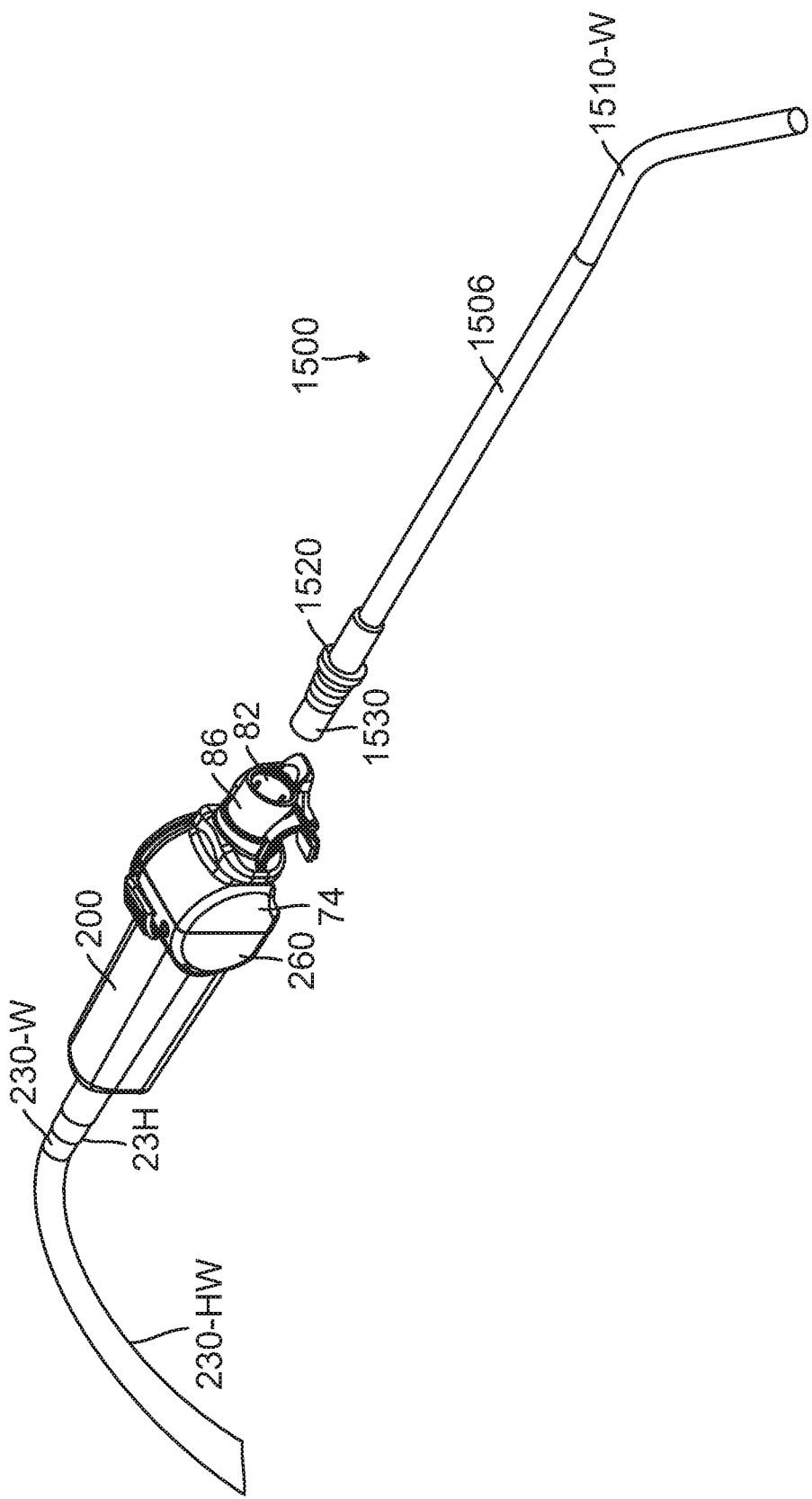
FIG. 2 is an exploded view of the assembled present invention handle affixed to a hose from a source of water at one end and a spray water dental tool or medical tool at an opposite end.

Referring to FIG. 1A, there is illustrated an exploded view of the components of the present invention handle to retain a dental tool or medical tool at one end and a source of suction or liquid at an opposite end. Referring to FIG. 1B, there is illustrated a duplicate exploded view of the components of the present invention handle to retain a dental tool or medical tool at one end and a source of suction or liquid at an opposite end. Referring to FIG. 2, there is illustrated an exploded view of the assembled present invention handle affixed to a hose from a source of water at on end and a spray water dental tool or medical tool at an opposite end.

Figure 3A:
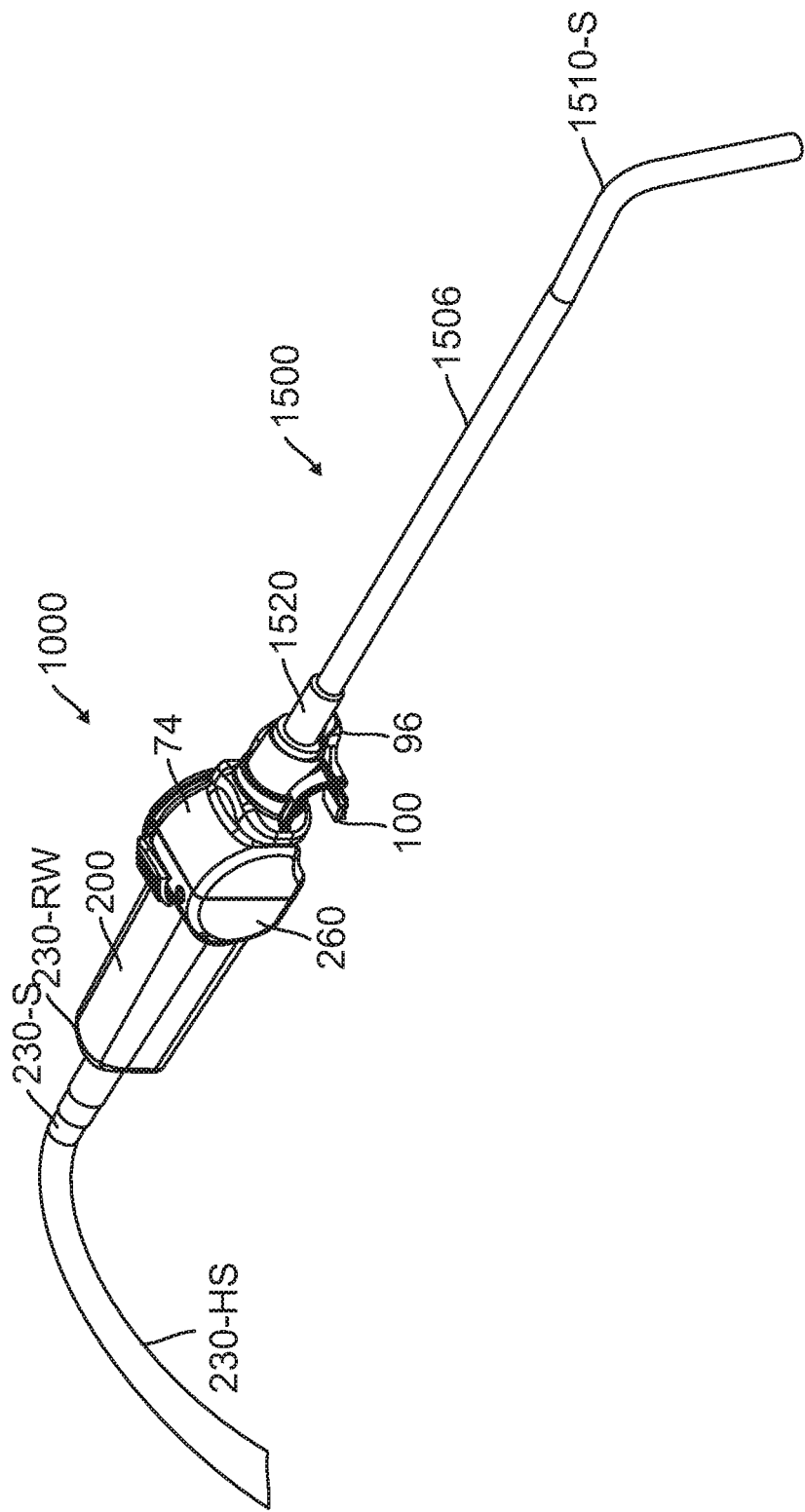
FIG. 3A is an assembled front perspective view of the present invention handle attached to a hose from a source of suction at one end and attached to a suction dental tool or suction medical tool at an opposite end.

Referring to FIG. 3A, there is illustrated an assembled front perspective view of the present invention handle attached to a hose from a source of suction at one end and attached to a suction dental tool or medical tool at an opposite end.

Figure 3B:
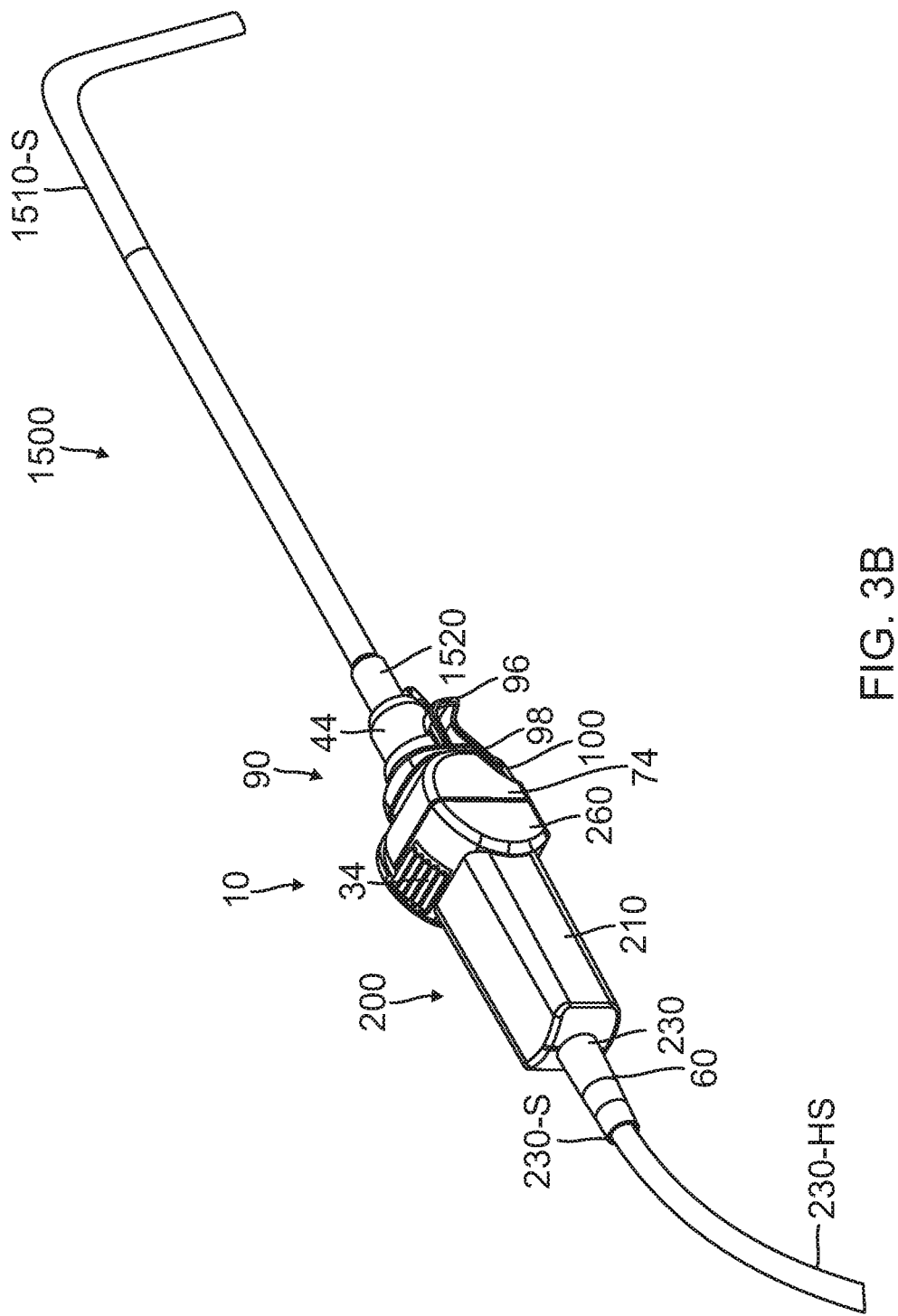
FIG. 3B is a duplicate assembled rear perspective view of the present invention handle attached to a hose from a source of suction at one end and attached to a suction dental tool or suction medical tool at an opposite end.

Referring to FIG. 3B, there is illustrated a duplicate assembled rear perspective view of the present invention handle attached to a hose from a source of suction at one end and attached to a suction dental tool or medical tool at an opposite end.

Figure 4:
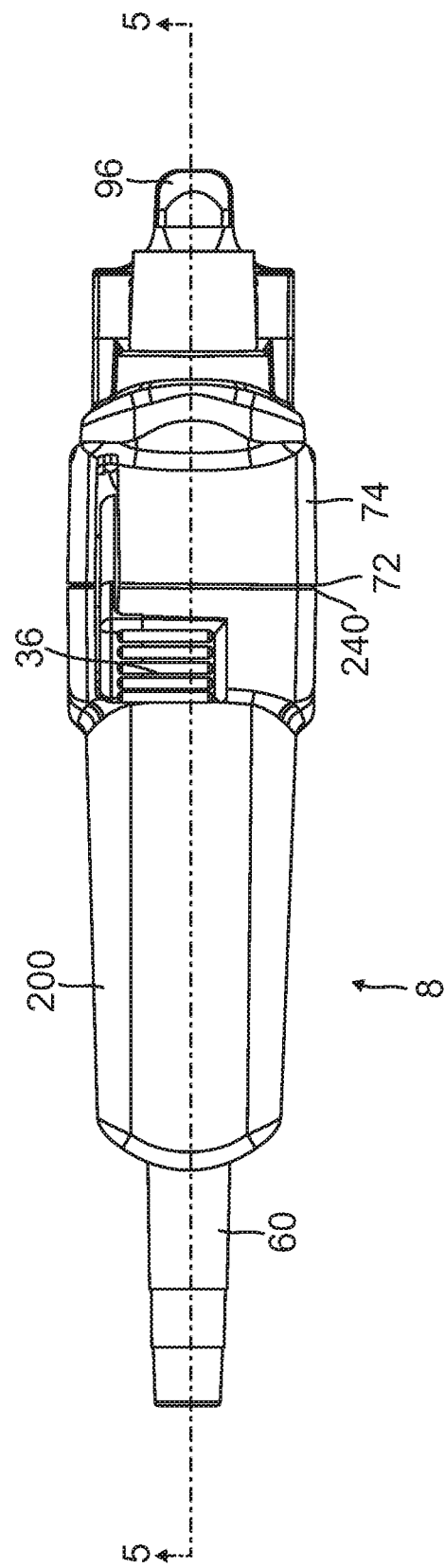
FIG. 4 is a top view of the assembled present invention handle.
Figure 5:
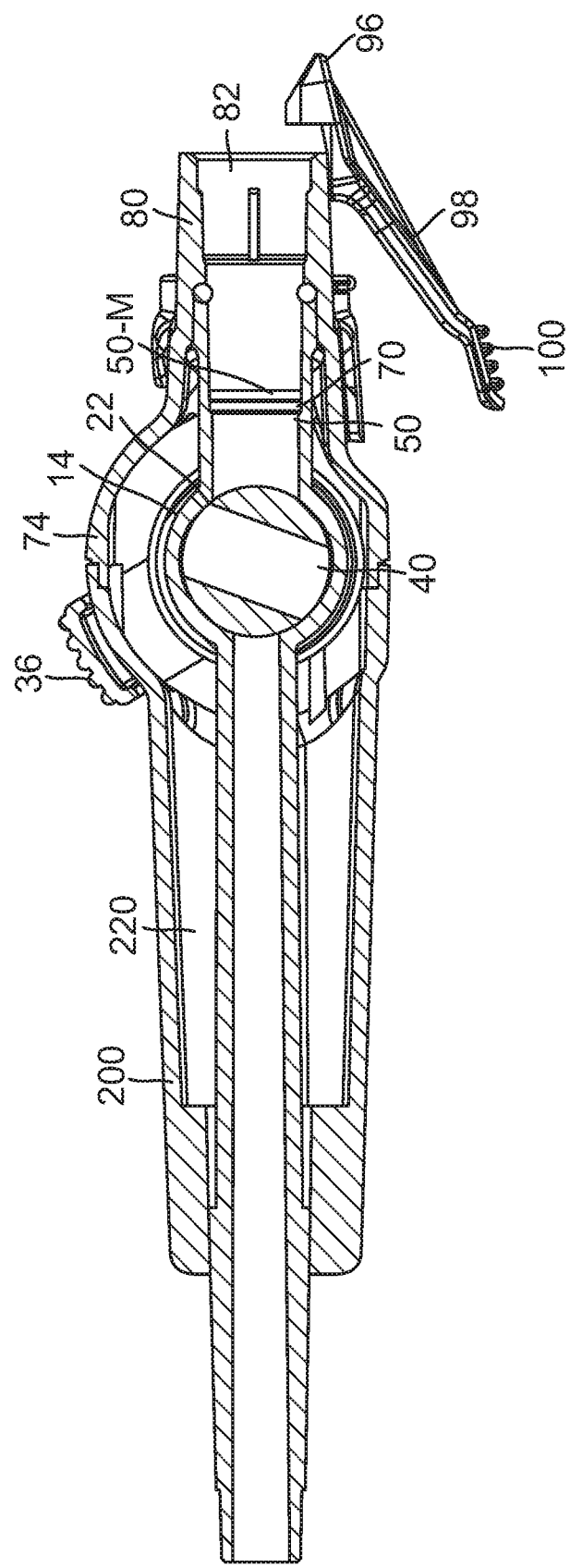
FIG. 5 is a cross-sectional view taken along line 5-5 of FIG. 4.
Figure 6:
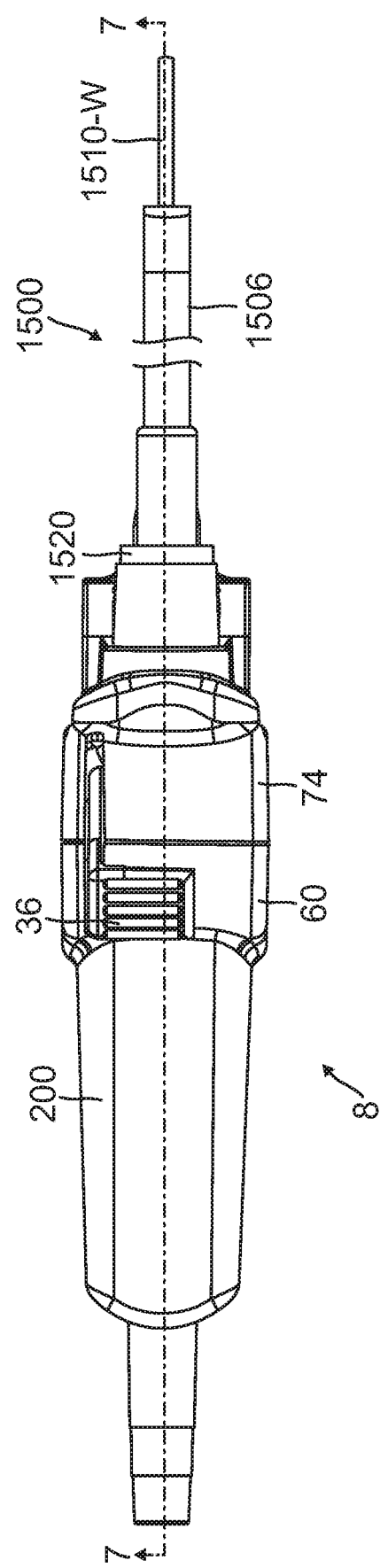
FIG. 6 is a top partially exploded view of the assembled handle of the present invention connected to a dental tool or a medical tool.
Figure 7:
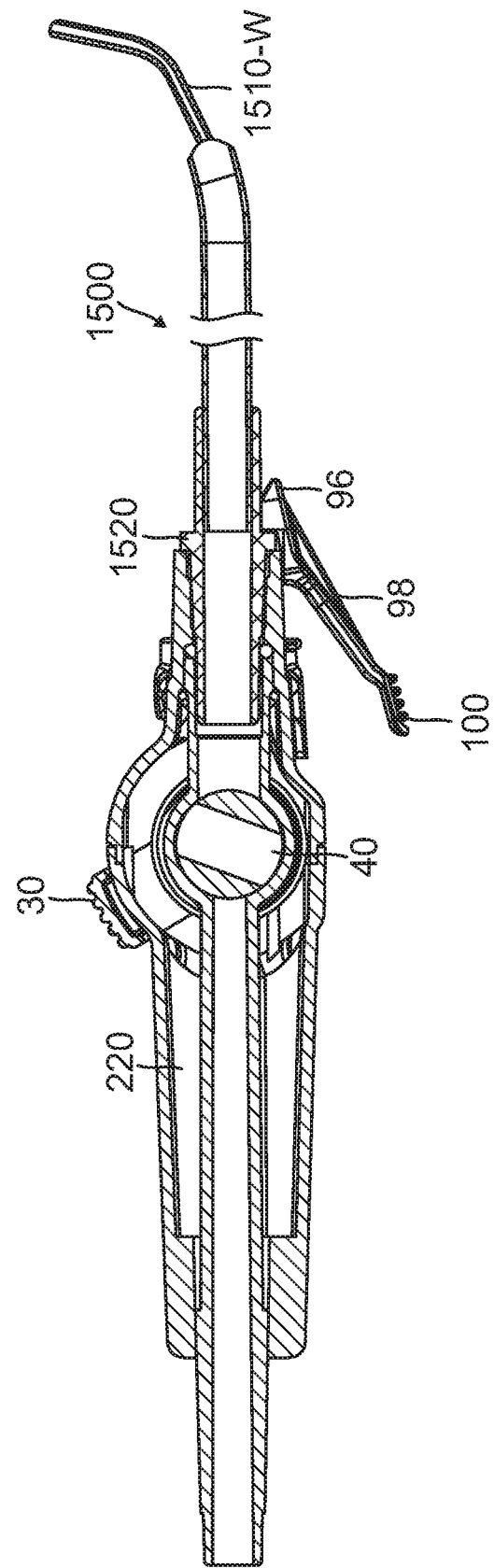
FIG. 7 is a cross-sectional view taken along line 7-7 of FIG. 6.
Figure 8:
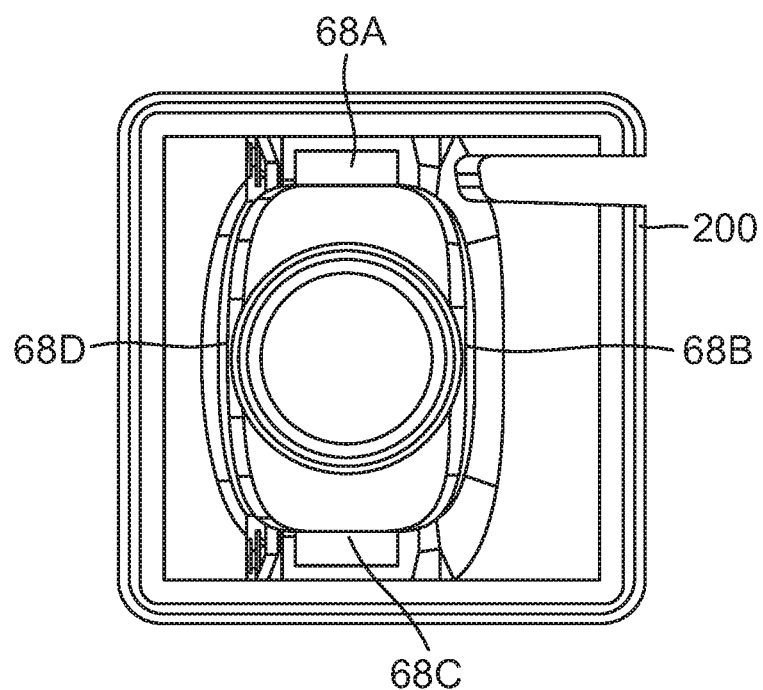
FIG. 8 is a cross-sectional view of a portion of the interior of the rear handle housing.

Referring to FIG. 4, there is illustrated a top view of the assembled present invention handle. Referring to FIG. 5, there is illustrated a cross-sectional view taken along line 5-5 of FIG. 4. Referring to FIG. 6, there is illustrated a top view of the assembled handle of the present invention connected to a dental tool or medical tool. Referring to FIG. 7, there is illustrated a cross-sectional view taken along line 7-7 of FIG. 6. Referring to FIG. 8, there is illustrated a cross-sectional view of a portion of the interior of the rear handle housing.

Figure 9:
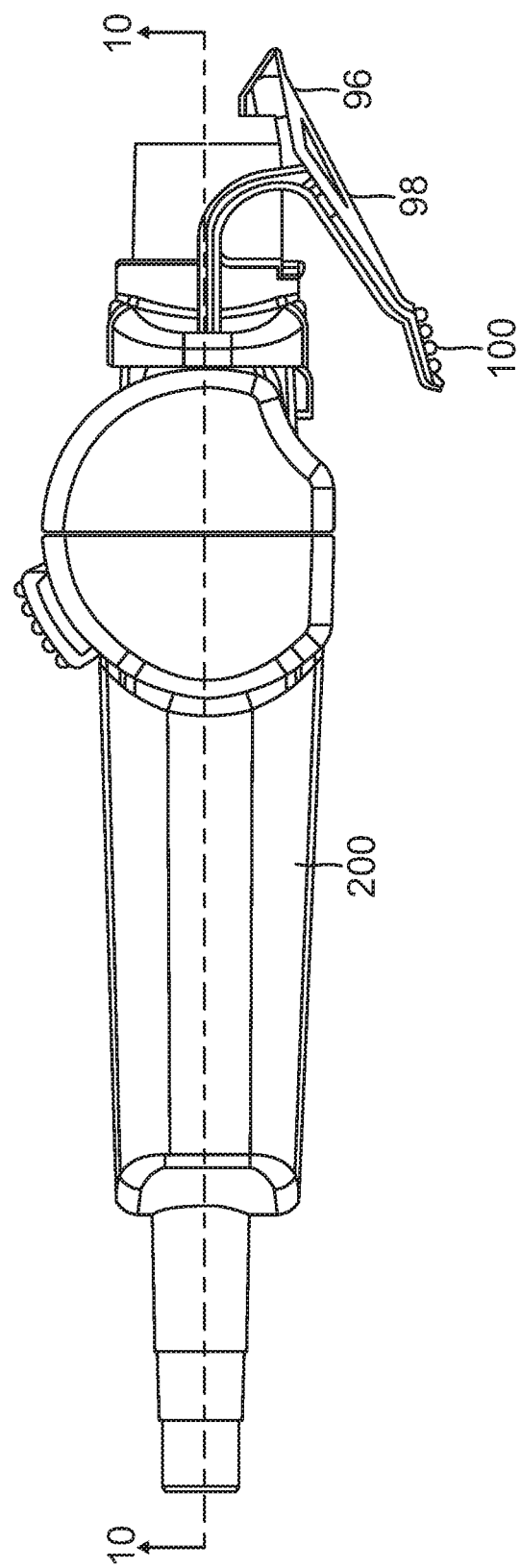
FIG. 9 is a top view of the assembled handle of the present invention.
Figure 10:
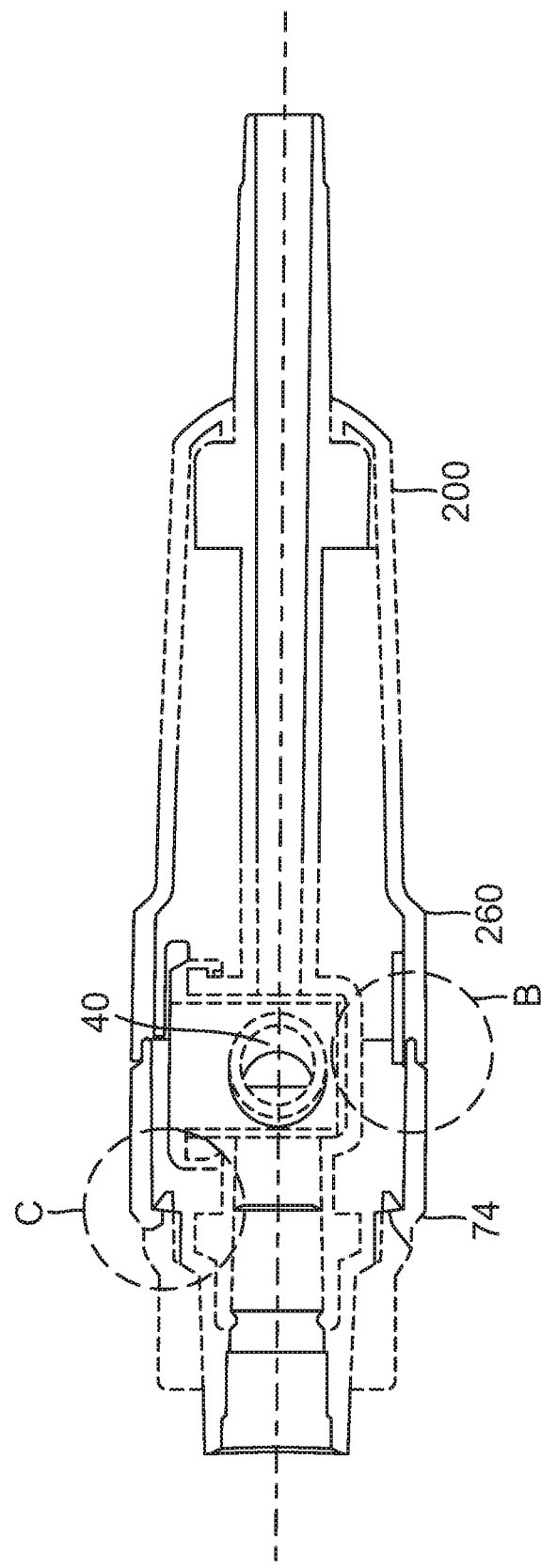
FIG. 10 is a cross-sectional view taken along line 10-10 of FIG. 9.
Figure 11:
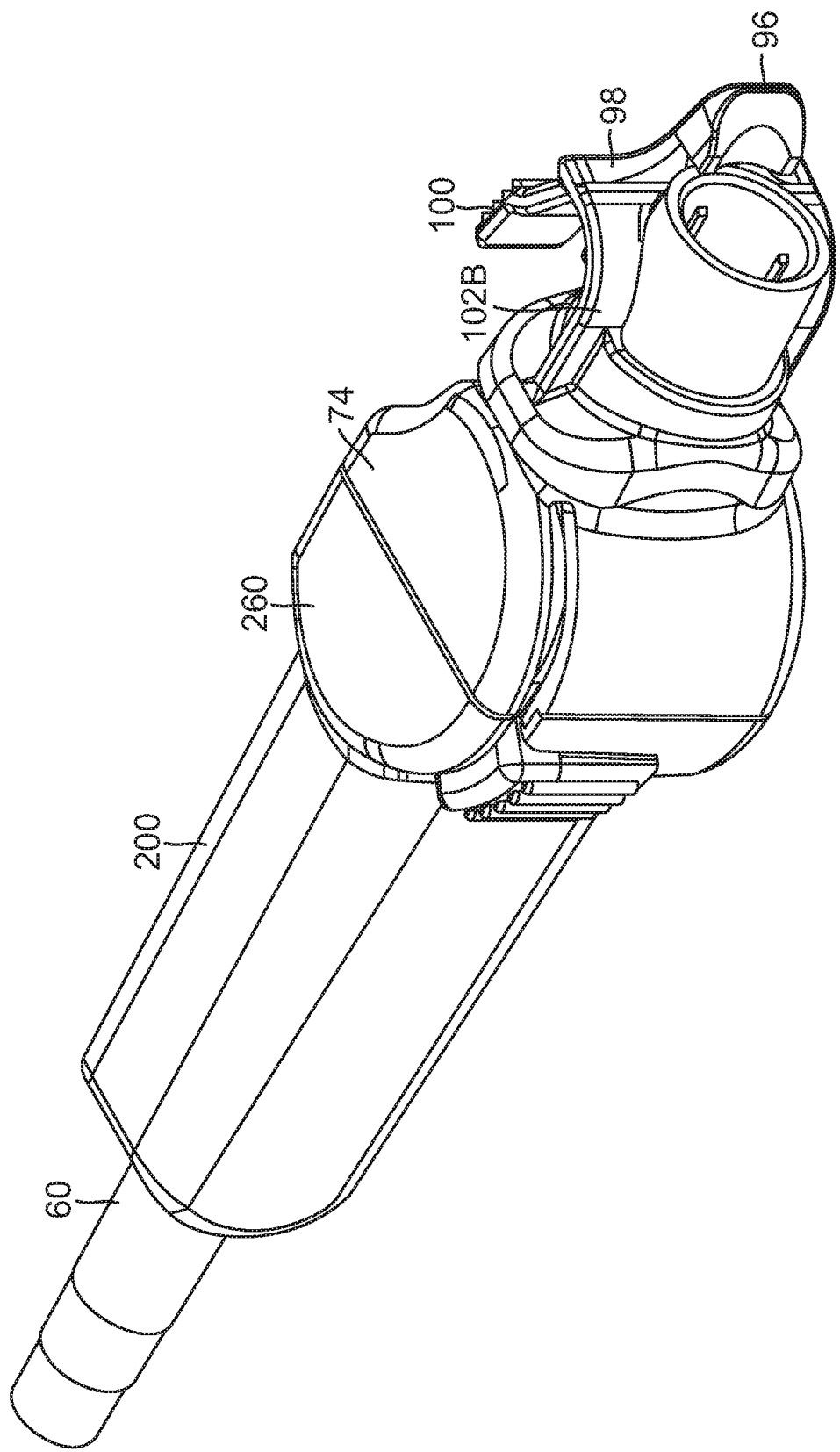
FIG. 11 is a top/side perspective view of the assembled present invention handle.

Referring to FIG. 9, there is illustrated a top view of the assembled handle of the present invention. Referring to FIG. 10, there is illustrated a cross-sectional view taken along line 10-10 of FIG. 9. Referring to FIG. 11, there is illustrated a top/side perspective view of the assembled present invention handle. Finally, referring to FIG. 12, there is illustrated a bottom/side perspective view of the assembled present invention handle.

Referring to FIGS. 1A through 12, the dental suction handle or medical suction handle 8 includes an interior valve body 10 having a cylindrical section 12 having a transverse cylindrical wall 14 surrounding an interior chamber 14-IC with openings at each transverse end 14A and 14B. An on/off rotatable switch 20 is comprised of a cylindrical wall 22 with an opening 22-SW therethrough. The cylindrical wall 22 surrounds an interior chamber 24 with an interior opening 26. A collar 28 encircles an exterior end 30 of cylindrical wall 22. A vertical arm 32 is affixed to the collar 28 at a proximal end 34 and a ribbed switch 36 extends transversely to the vertical arm 32. The cylindrical wall 22 is inserted through transverse cylindrical chamber 14-IC and a ball valve 40 is retained within the interior chamber 24. When the ribbed switch 36 is rotated in one direction such as counterclockwise, the ball valve 40 does not block opening 22-SW and air can flow through the opening for an "on" position. When the ribbed switch 36 is rotated in an opposite direction, such as clockwise, the ball valve 40 blocks opening 22-SW to prevent air flow (or water flow) for an "off" position.

A first elongated short cylindrical shaft 44 includes a first interior end 46 incorporated into the cylindrical section 12. At a first exterior end 48, the first elongated short cylindrical shaft 44 has exterior circumferential threads 50. A second elongated cylindrical shaft 60 is incorporated into cylindrical section 12 at a first interior end 62 incorporated at a location opposite to and in fluid communication with first interior end 46 of first elongated short cylindrical shaft 44, the second elongated cylindrical shaft 60 terminating in a second exterior end 64. One improvement in the present invention is the incorporation of aligning fins 66A, 66B, 66C and 66D around second elongated cylindrical shaft 60. The rear handle housing 200 includes aligned receiving slots 68A, 68B, 68C and 68C as illustrated in FIG. 8. Therefore, the second elongated cylindrical shaft 60 is perfectly aligned with rear shaft 230-W and its rear section 230-W is connected to a source of water hose 230-HW as illustrated in FIG. 2. Alternatively, the rear section 230-S is connected to a source of suction hose 230-HS as illustrated in FIGS. 3A and 3B. The rear handle housing 200 includes a longitudinal body 210 with a square interior wall 220 and a longitudinal rear wall 230-RW with the shaft 230 and tip section 230-S extending through it. The longitudinal body 210 surrounds a longitudinal interior chamber 240 which fits over second elongated cylindrical shaft 60. The longitudinal interior chamber 240 terminates in a wide opening 242 surrounded by front housing 260 with a front wall 250. The front housing 260 fits over a portion of cylindrical section 12. The entire interior of all components are in fluid communication. Optionally, as illustrated in FIGS. 1A and 1B, second elongated cylindrical shaft 60 and rear shaft 230 can be one integral unit.

Referring again to the short cylindrical shaft 44, only a single O-ring 70 is placed in front of threads 50 at the exterior end 48 of shaft 44, which threads are threaded into female mating threads 50-M as illustrated in FIG. 5, in an interior of front handle housing 74. Front handle housing 74 is shaped to cover a portion of cylindrical section 12. Front handle housing 74 has a front cylindrical shaft 80 affixed at an interior end 78 to front handle housing 74. Front cylindrical shaft 80 has an exterior wall 83 surrounding an interior chamber 82 which will be fluidly connected to a dental or medical apparatus.

One significant improvement of the present invention is that rear handle housing 200 and front handle housing 74 are selected from the group consisting of sonically or ultrasonically welded together. Front face 250 of rear handle housing 200 has a front wall 260 which is sonically or ultrasonically welded to front face 72 of front handle housing 74. This creates a much stronger bond to withstand forces imparted to the handle 8 during a dental or medical procedure.

Another improvement in the present invention handle 8 is an improved clip 90. The clip 90 includes a central body 92 which surrounds interior opening 94. A retaining hook 96 is attached by spring loaded attachment members 110A and 110B. The spring loaded hook 96 includes a shaft 98 terminating in a press handle 100. The opening 94 is placed over exterior wall 83 of front cylindrical shaft 80. An additional improvement is the incorporation of oppositely disposed receiving slots 84A and 84B in front wall 86 of front handle housing 74. Clip 90 includes a pair of spaced apart oppositely disposed male tabs 102A and 102B which respectively mate with oppositely disposed receiving slots 84A and 84B. Therefore, the clip 90 is securely attached to front handle housing 74 and is aligned with front handle housing 74. The clip 90 is sonically welded or ultrasonically welded to the front handle housing.

Referring to FIG. 2, there is illustrated an exploded view of a dental tool or medical tool 1500 having a shaft 1506 with a dental or medical spray tube 1510-W at a distal end and/or referring to FIGS. 3A and 3B, a dental or medical suction tube 1510-S, each with a collar 1520 surrounding a proximal end 1530 of shaft 1506. The proximal end 1530 is inserted into opening 82 of front cylindrical shaft 80 of housing 74. In the prior art, the insertion was a press fit which frequently came loose. Referring to FIGS. 3A and 3B, there is illustrated an assembled perspective view of the proximal end 1530 of shaft 1506 retained in opening 82 with the hook 96 of the improved clip 90 retaining collar 1520 for a secure retention. The spring members 110A and 110B of the improved clip 90 exert a retaining force on the hook 96 to securely retain the dental or medical spray tube 1510-W or dental or medical suction tube 1510-S.

The present invention handle 8 provides the following significant improvements over the prior art. First, the front handle housing 74 is sonically or ultrasonically welded to rear handle housing 200 to provide a strong bond between the two handle cover sections. This is a much stronger bond than the previous method of gluing the two cover sections together.

The design of the clip with the spring force members 102A and 102B provides a strong retention force of the hook 96 to retain any dental or medical tool or dental or medical apparatus. The combination slots 84A and 84B in front face 86 of valve front housing 74 are combined with tabs 102A and 102B in clip 90 and sonically or ultrasonically welded together to provide for a secure retention of the improved clip 90.

The locating fins 66A, 66B, 66C and 66D on second elongated cylindrical shaft 60 combined with receiving slots 68A, 68B, 68C and 68D on the interior of rear handle housing 200 maintain orientation of the second elongated cylindrical shaft 60 with the suction attachment shaft 230 and tip section 230-S for suction to assure a constant flow of suction or water flow attachment shaft 230 and tip section 230-W to assure a constant flow of spray water from the source. The ribs further align the shaft 60 with the short shaft 80 to assure proper airflow to the dental apparatus 1500.

The design of the combination housing 74 and 200 facilitates the access to the ribbed on/off switch 36.

Further referring to FIG. 10 which is a cross-sectional view taken along line 10-10 of FIG. 9, Circle "B" illustrates the location where front handle housing 74 is sonically or ultrasonically welded to rear handle housing 200. Circle "C" illustrates where the clip 90 is sonically or ultrasonically welded to the front of front handle housing 74. The parts have already been identified.

Figure 12:
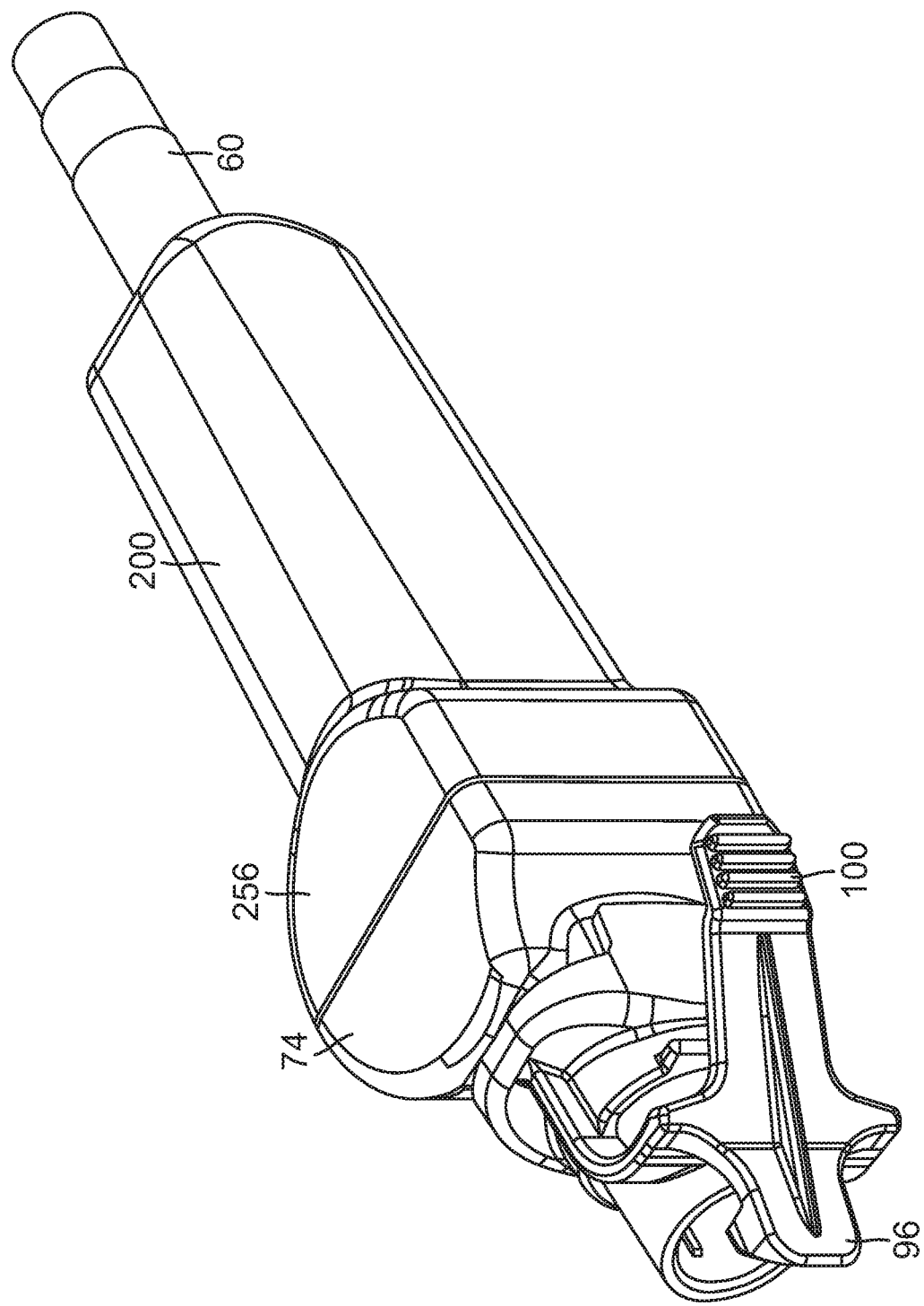
FIG. 12 is a bottom/side perspective view of the assembled present invention handle.

Referring to FIG. 11, there is illustrated a top/side perspective view of the assembled present invention handle; and Referring to FIG. 12, there is illustrated a bottom/side perspective view of the assembled present invention handle.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A handle for attachment to a source selected from the group consisting of suction and liquid at a rear end and attached to a tool selected from a dental tool and a medical tool at a front end, the handle comprising:

(a) an interior valve body having a cylindrical section including a transverse cylindrical wall surrounding an interior chamber with openings at each transverse end, an on/off rotatable switch including a cylindrical wall with an opening therethrough, the cylindrical wall surrounding an interior chamber, a collar encircling an exterior end of the cylindrical wall with a vertical arm affixed to the collar at a proximal end and a ribbed switch extending transversely to the vertical arm at a distal end of the vertical arm, the cylindrical wall of the on/off switch inserted through the interior chamber of the transverse cylindrical wall and a ball valve retained within the interior chamber of the on/off switch;

(b) a first short cylindrical shaft including a first interior end incorporated into the cylindrical section and a first exterior end with external threads, a second elongated cylindrical shaft incorporated into the cylindrical section at a first interior end incorporated at a location opposite to and in fluid communication with the first interior end of the first short cylindrical shaft, the second elongated cylindrical shaft terminating in a second exterior end, a multiplicity of spaced apart aligning fins around the second elongated cylindrical shaft;

(c) a rear handle housing having an interior chamber encircling the second elongated cylindrical shaft with a multiplicity of interior receiving slots to respectively retain a respective aligning fin, the second elongated cylindrical shaft extending out of a rear wall of the rear handle housing, the rear handle housing terminating in a wide opening surrounded by a front housing with a front wall, the front housing fitting over a portion of the cylindrical section;

(d) a front handle housing retaining the short cylindrical shaft, the front handle housing covering a portion of the cylindrical section, the front handle housing including a front cylindrical shaft affixed at an interior end to the front handle housing and having an exterior wall surrounding an interior chamber, the front handle housing having a rear circumferential wall selected from the group consisting of sonically and ultrasonically welded to the front wall of the rear handle housing; and (e) a clip including a central body which surrounds an interior opening, a retaining hook attached by spring loaded attachment members to the central body, the front handle housing including a pair of receiving slots, the central body of the clip including a pair of oppositely disposed retaining tabs respectively inserted into and selected from the group consisting of sonically and ultrasonically welded to the respective receiving slots, the interior opening of the clip retained surrounding the front cylindrical shaft of the front handle housing;

(f) wherein said dental tool or medical tool including a shaft is retained within the front cylindrical shaft of the front handle housing, said dental tool or medical tool including a collar surrounding the shaft, the hook of the clip securely retaining the collar through a retaining force on the hook imparted by the spring loaded attachment members.

2. A handle for attachment to a tool selected from the group consisting of a dental tool and a medical tool, the handle comprising:

(a) an interior valve body having a cylindrical section including a transverse cylindrical wall surrounding an interior chamber with openings at each transverse end, an on/off rotatable switch including a cylindrical wall with an opening therethrough, the cylindrical wall surrounds an interior chamber with an interior opening, a collar encircles an exterior end of the cylindrical wall, a vertical arm is affixed to the collar at a proximal end and a ribbed switch extends transversely to the vertical arm, a ball valve is retained within the interior chamber, when the ribbed switch is rotated in one direction such as counterclockwise, the ball valve does not block the opening in the cylindrical wall and air can flow through the opening for an "on" position, and when the ribbed switch is rotated in an opposite direction, such as clockwise, the ball to valve blocks the opening in the cylindrical wall to prevent air flow through the opening for an "off" position;

(b) a first short cylindrical shaft includes a first interior end incorporated into said cylindrical section, and at a first exterior end, the first short cylindrical shaft has exterior circumferential threads, a second elongated cylindrical shaft is incorporated into said cylindrical section at a first interior end incorporated at a location opposite to and in fluid communication with the first interior end of the first elongated short cylindrical shaft, the second elongated cylindrical shaft terminating in a second exterior end, with four aligning fins incorporated into an exterior surface of the second elongated cylindrical shaft and spaced ninety degrees apart, the four aligning fins perpendicular to the second elongated cylindrical shaft, the aligning fins respectively aligned with a respective one of four receiving slots in a rear handle housing to align the second elongated cylindrical shaft with a rear shaft connected to a source of suction;

(c) said rear handle housing includes a longitudinal body with a square interior wall and a longitudinal rear wall with said shaft extending through the rear wall, the longitudinal body surrounds a longitudinal interior chamber which fits over said second elongated cylindrical shaft, the longitudinal interior chamber terminates in a wide opening surrounded by a front housing with a front wall, the front housing fits over a portion of said cylindrical section so that an entire interior of all components are in fluid communication;

(d) said short cylindrical shaft includes a single O-ring placed in front of said exterior threads at the exterior end of said short cylindrical shaft, said exterior threads are threaded into female mating threads in an interior of a front handle housing;

(e) said front handle housing is shaped to cover a portion of said cylindrical section, said front handle housing has a front cylindrical shaft affixed at an interior end to said front handle housing, said front cylindrical shaft has an exterior wall surrounding an interior chamber which is fluidly connected to said tool selected from the group consisting of said dental tool and said medical tool;

(f) said rear handle housing and said front handle housing are selected from the group consisting of sonically welded and ultrasonically welded together, said front face of said rear handle housing has a front wall which is sonically or ultrasonically welded to said front face of said front handle housing which creates a strong bond to withstand forces imparted to the handle during a dental or medical procedure; and (g) a clip includes a central body which surrounds an interior opening, a retaining hook is attached by spring loaded attachment members, the spring loaded hook includes a shaft terminating in a press handle, said opening is placed over an exterior wall of said front cylindrical shaft, the front handle housing includes two oppositely disposed receiving slots in said front wall of said front handle housing, said clip includes a pair of spaced apart oppositely disposed male tabs which respectively mate with said oppositely disposed receiving slots to securely attach said clip to said front handle housing so that said clip is aligned with said front handle housing, said clip is selected from the group consisting of sonically welded and ultrasonically welded to the front handle housing.

3. The handle in accordance with claim 2, further comprising: said dental tool or said medical tool at a distal end of a shaft, a collar surrounding a proximal end of said shaft, the proximal end of said shaft is inserted into said opening of said front cylindrical shaft of said front housing, the proximal end of said shaft is retained in said opening with said hook of said clip retaining said collar for a secure retention through the spring members of the clip exerting a retaining force on the hook to securely retain the dental tool or the medical tool.

4. The handle in accordance with claim 3, further comprising:

(a) said dental tool and said medical tool is a suction tube; and (b) said rear shaft is connected to a hose connected to a source of suction.

5. A handle for attachment to a dental tool or medical tool, the handle comprising:

(a) an interior valve body having a cylindrical section including a transverse cylindrical wall surrounding an interior chamber with openings at each transverse end, an on/off rotatable switch including a cylindrical wall with an opening therethrough, the cylindrical wall surrounds an interior chamber with an interior opening, a collar encircles an exterior end of the cylindrical wall, a vertical arm is affixed to the collar at a proximal end and a ribbed switch, extends transversely to the vertical arm, a ball valve is retained within the interior chamber, when the ribbed switch is rotated in one direction such as counterclockwise, the ball valve does not block the opening in the cylindrical wall and water can flow through the opening for an "on" position, and when the ribbed switch is rotated in an opposite direction, such as clockwise, the ball valve blocks the opening in the cylindrical wall to prevent water flow through the opening for an "off" position;

(b) a first short cylindrical shaft includes a first interior end incorporated into said cylindrical section, and at a first exterior end, the first short cylindrical shaft has exterior circumferential threads, a second elongated cylindrical shaft is incorporated into said cylindrical section at a first interior end incorporated at a location opposite to and in fluid communication with the first interior end of the first elongated short cylindrical shaft, the second elongated cylindrical shaft terminating in a second exterior end, with four aligning fins incorporated into an exterior surface of the second elongated cylindrical shaft and spaced ninety degrees apart, the four aligning fins perpendicular to the second elongated cylindrical shaft, the aligning fins respectively aligned with a respective one of four receiving slots in a rear handle housing to align the second elongated cylindrical shaft with a rear shaft connected to a source of water;

(c) said rear handle housing includes a longitudinal body with a square interior wall and a longitudinal rear wall with said shaft extending through the rear wall, the longitudinal body surrounds a longitudinal interior chamber which fits over said second elongated cylindrical shaft, the longitudinal interior chamber terminates in a wide opening surrounded by a front housing with a front wall, the front housing fits over a portion of said cylindrical section so that an entire interior of all components are in fluid communication;

(d) said short cylindrical shaft includes a single O-ring placed in front of said exterior threads at the exterior end of said short cylindrical shaft, said exterior threads are threaded into female mating threads in an interior of a front handle housing;

(e) said front handle housing is shaped to cover a portion of said cylindrical section, said front handle housing has a front cylindrical shaft affixed at an interior end to said front handle housing, said front cylindrical shaft has an exterior wall surrounding an interior chamber which is fluidly connected to a dental apparatus;

(f) said rear handle housing and said front handle housing are sonically or ultrasonically welded together, said front face of said rear handle housing has a front wall which is sonically or ultrasonically welded to said front face of said front handle housing which creates a strong bond to withstand forces imparted to the handle during a dental procedure;

(g) a clip includes a central body which surrounds an interior opening, a retaining hook is attached by spring loaded attachment members, the spring loaded hook includes a shaft terminating in a press handle, said opening is placed over an exterior wall of said front cylindrical shaft, the front handle housing includes two oppositely disposed receiving slots in said front wall of said front handle housing, said clip includes a pair of spaced apart oppositely disposed male tabs which respectively mate with said oppositely disposed receiving slots to securely attach said clip to said front handle housing so that said clip is aligned with said front handle housing, said clip is sonically welded or ultrasonically welded to the front handle housing.

6. The handle in accordance with claim 5, further comprising: a dental tool or medical tool at a distal end of a shaft, a collar surrounding a proximal end of said shaft, the proximal end of said shaft is inserted into said opening of said front cylindrical shaft of said front housing, the proximal end of said shaft is retained in said opening with said hook of said clip retaining said collar for a secure retention through the spring members of the clip exerting a retaining force on the hook to securely retain the dental tool or medical tool.

7. The handle in accordance with claim 6, further comprising:
(a) said dental tool or medical tool is a water spray tube; and
(b) said rear shaft is connected to a hose connected to a source of water.

\* \* \* \* \*